(12) United States Patent
Sisken et al.

(10) Patent No.: US 8,375,700 B2
(45) Date of Patent: Feb. 19, 2013

(54) APPARATUS AND METHOD FOR MONITORING OXIDATION CATALYST FUNCTIONALITY

(75) Inventors: Kevin Dean Sisken, Saline, MI (US); Yi Liu, Northville, MI (US)

(73) Assignee: Detroit Diesel Corporation, Detroit, MI (US)

(*) Notice: Subject to any disclaimer, the term of this patent is extended or adjusted under 35 U.S.C. 154(b) by 454 days.

(21) Appl. No.: 12/750,088

(22) Filed: Mar. 30, 2010

(65) Prior Publication Data

US 2011/0239627 A1 Oct. 6, 2011

(51) Int. Cl.
*F01N 3/00* (2006.01)

(52) U.S. Cl. ............... 60/277; 60/274; 60/286; 60/295; 60/301

(58) Field of Classification Search ............ 60/274, 60/277, 284–287, 295–301
See application file for complete search history.

(56) References Cited

U.S. PATENT DOCUMENTS

| | | | |
|---|---|---|---|
| 6,928,806 B2 * | 8/2005 | Tennison et al. | 60/286 |
| 7,426,825 B2 | 9/2008 | Viola et al. | |
| 2008/0250778 A1 * | 10/2008 | Solbrig | 60/301 |
| 2009/0158719 A1 | 6/2009 | Hallstrom et al. | |
| 2009/0193794 A1 | 8/2009 | Robel et al. | |
| 2009/0272101 A1 * | 11/2009 | Wills et al. | 60/286 |
| 2009/0272104 A1 | 11/2009 | Garimella et al. | |
| 2010/0024397 A1 * | 2/2010 | Chi et al. | 60/285 |

* cited by examiner

*Primary Examiner* — Thomas E. Denion
*Assistant Examiner* — Jesse Bogue
(74) *Attorney, Agent, or Firm* — Bill C. Panagos; Butzel Long, PC

(57) ABSTRACT

Method and apparatus for evaluating an ammonia conversion efficiency of an ammonia oxidation (AMOX) catalyst for reducing ammonia and hydrocarbons present in an exhaust gas stream. The AMOX associated with an exhaust gas aftertreatment system has a selective catalytic reduction (SCR) catalyst for reducing nitrogen oxides ($NO_x$) present in the exhaust gas stream and a dosing system for introducing a reductant into the exhaust gas stream for reacting with the nitrogen oxides in the presence of the SCR catalyst. The AMOX catalyst is arranged downstream of the SCR catalyst.

17 Claims, 3 Drawing Sheets

APPARATUS AND METHOD FOR MONITORING OXIDATION CATALYST FUNCTIONALITY

BACKGROUND

Internal combustion engines produce exhaust gases that include undesirable combustion byproducts, such as oxides of nitrogen ($NO_X$). Emission control systems may be employed to reduce $NO_X$ emissions. For example, $NO_X$ reduction catalysts, including selective catalytic reduction (SCR) catalysts, are utilized to convert $NO_X$ (NO and $NO_2$ in some fraction) to $N_2$ and other compounds, such as water ($H_2O$). SCR catalysts utilize a reductant, such as ammonia ($NH_3$), to reduce the $NO_X$. Emission systems may also utilize an alternate compound, such as urea, which vaporizes and decomposes to ammonia in the exhaust gas stream. These compounds and the exhaust gases react with a catalyst to help reduce emissions. Currently available SCR catalysts can produce high $NO_X$ conversion rates.

SCR catalysts generate ammonia to reduce the $NO_X$. When just the right amount of ammonia is available at the SCR catalyst under the proper conditions, substantially the entire quantity of ammonia is utilized to reduce $NO_X$, with only a small portion, if any, exiting the SCR catalyst. If the reduction reaction rate is too slow, however, or there is excess ammonia in the exhaust gas stream, ammonia can slip out the exhaust pipe. Further, when using urea under certain operating conditions, the urea may decompose to ammonia downstream of the SCR, causing ammonia slip and less ammonia available for $NO_X$ reduction and higher $NO_X$ emissions at the tailpipe. To help minimize ammonia slip, SCR systems may utilize an ammonia oxidation (AMOX) catalyst arranged downstream of the SCR catalyst to reduce at least a portion of ammonia slipping from the SCR catalyst to $N_2$ and other less harmful compounds.

DETAILED DESCRIPTION

Figure 1:
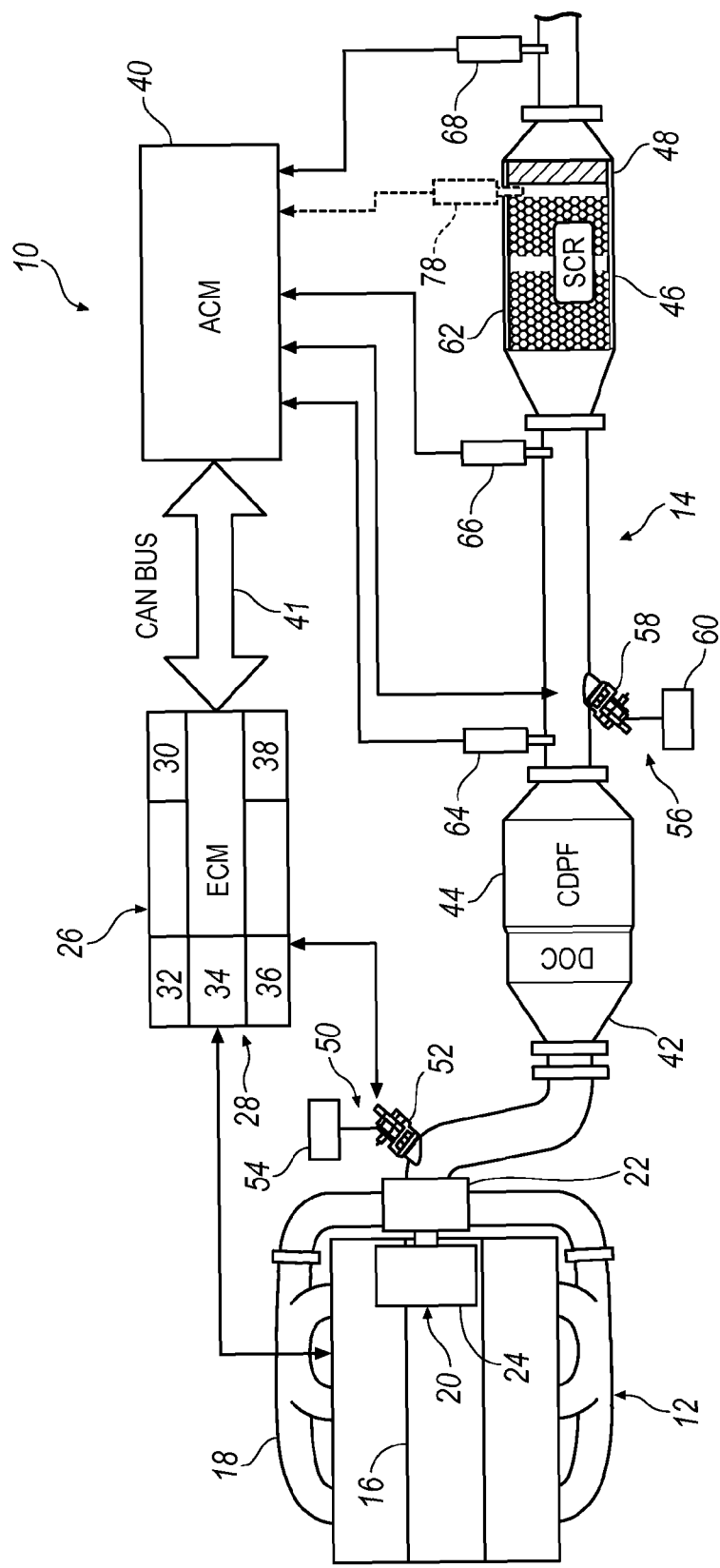
FIG. 1 schematically illustrates an exemplary internal combustion engine emission system employing a selective catalytic reduction (SCR) catalyst and ammonia oxidizing (AMOX) catalyst.

Referring now to the discussion that follows and to the drawings, illustrative approaches to the disclosed systems and methods are described and shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

FIG. 1 illustrates an exemplary internal combustion engine system 10 that includes an internal combustion engine 12 and an exhaust gas after-treatment system 14 coupled to an exhaust discharge of engine 12. Internal combustion engine 12 may be a compression ignited internal combustion engine, for example a diesel fueled engine, or a spark-ignited internal combustion engine, such as a gasoline fueled engine. Engine system 10 may further include an intake manifold 16 fluidly connected to compression chambers of the internal combustion engine 12 for introducing air into the compression chambers, and an exhaust manifold 18, also fluidly connected to the compression chambers for receiving an exhaust gas stream discharged from the compression chambers. Fluidly connected to intake manifold 16 and exhaust manifold 18 is a turbocharger 20, which includes a turbine 22 and a compressor 24.

Air and fuel may be combined together and combusted within the engine compression chambers to produce power. The exhaust gas stream produced as a byproduct of combustion may be operatively vented to exhaust manifold 18. Turbine 22 extracts energy from the exhaust gas stream passing through exhaust manifold 18. The extracted energy provides power for driving compressor 24, which compresses at least a portion of the air passing through intake manifold 16.

Internal combustion engine system 10 may include an electronic engine control module (ECM) 26 for controlling the operation of engine 12 and exhaust gas after-treatment system 14. ECM 26 may receive signals generated by various sensors, and process the signals to control engine and/or vehicle emission systems. ECM 26 may include a computer-readable storage media, indicated generally by reference numeral 28, for storing command data representing instructions executable by a computer, such as a micro-processor 30, to control engine 12 and exhaust gas after-treatment system 14.

Computer-readable storage media 28 may include, but is not limited to, a random access memory (RAM) 32, in addition to various non-volatile memory, such as read-only memory (ROM) 34, and non-volatile memory (NVRAM) 36. Computer-readable storage media 28 may communicate with microprocessor 30 and input/output (I/O) circuitry 38 via a control/address bus. Computer-readable storage media 28 may include various types of physical devices for temporary and/or persistent storage of data, which may include solid state, magnetic, optical, and/or combination devices. For example, computer readable storage media 28 may be implemented using one or more physical devices, such as DRAM, PROMS, EPROMS, EEPROMS, and flash memory, to name a few. In an exemplary application, ECM 26 processes input signals received from engine sensors and vehicle sensors by executing instructions stored in computer-readable storage media 28 to generate output signals for control of engine 12 and exhaust gas after-treatment system 14 via corresponding actuators.

Exhaust gas after-treatment system 14 may be coupled to turbocharger 20 of engine 12. At least a portion of the exhaust gas stream exiting exhaust manifold 18 passes through exhaust gas after-treatment system 14. Exhaust gas after-treatment system 14 may be configured to remove various chemical compounds and particulate emissions present in the exhaust gas stream.

Exhaust gas after-treatment system 14 may include an after-treatment control module (ACM) 40. An electronic communication link 41 operably connects ACM 40 to ECM 26. Communication link 41 may be a controller-area network (CAN-bus) that enables ECM 26 and ACM 40 to communicate with each other. Although shown as separate components in FIG. 1, ACM 40 and ECM 26 may be combined as a single device.

Exhaust gas after-treatment system 14 may further include a diesel oxidation catalyst (DOC) 42, a catalyzed diesel particulate filter (CDPF) 44, a selective catalytic reduction (SCR) catalyst 46, and an ammonia oxidation (AMOX) catalyst 48. The exhaust gas stream from engine 12 may flow from exhaust manifold 18, through diesel oxidation catalyst 42, through catalyzed diesel particulate filter 44, through SCR catalyst 46, through AMOX catalyst 48, and then discharged into the atmosphere. Particulate filter 44 is generally arranged downstream of diesel oxidation catalyst 42, SCR catalyst 46 is arranged downstream of particulate filter 44, and AMOX catalyst 48 is arranged downstream of SCR catalyst 46. The terms "downstream" and "upstream", when used to describe a relative position between components, refer to the relative positions in the exhaust system as sensed in the direction of flow of the exhaust gas stream. Generally, exhaust gas treated in exhaust gas after-treatment system 14 and released into the atmosphere contains significantly fewer pollutants, such as diesel particulate matter, $NO_X$, and hydrocarbons, such as carbon monoxide and carbon dioxide, than untreated exhaust gas.

Diesel oxidation catalyst 42 operates to oxidize at least a portion of the particulate matter, such as the soluble organic portion of soot present in the exhaust gas stream, and convert unburned hydrocarbons and CO present in the exhaust gas stream to less hazardous compounds, such as $N_2$ and $H_2O$. Particulate filter 44 operates to reduce particulate matter concentrations, such as soot and ash present in the exhaust gas stream to meet requisite emission standards. Particulate filter 44 may require periodic regeneration to remove accumulated soot and particulate matter that has accumulated in the filter and may be blocking the flow of exhaust gas through the filter. One way to accomplish this is by heating particulate filter 44 to a sufficiently high temperature to combust the accumulated particulate matter and soot. A fuel borne catalyst may be employed to reduce the combustion temperature. A particulate filter regeneration system 50 may include a hydrocarbon (HC) doser 52 operably connected to ECM 26, and fluidly connected to a fuel reservoir 54. Fuel reservoir 54 may be a container or tank capable of retaining a fuel, such as, for example, diesel fuel or diesel oil. Fuel reservoir 54 may also store fuel for powering engine 12. Fuel from fuel reservoir 54 injected into the exhaust gas stream though HC doser 52 combusts to heat particulate filter 44 and burn off the accumulated particulate matter and soot.

SCR catalyst 46 may include a reductant delivery system 56 that includes a $NO_X$ reductant doser 58 operably connected to after-treatment control module 40, and a reductant tank 60 fluidly connected to $NO_X$ reductant doser 58. Reductant tank 60 may be a container or tank capable of retaining a reductant, such as, for example, ammonia ($NH_3$), urea, diesel fuel, or diesel oil. $NO_X$ reductant doser 58 is generally positioned upstream of SCR catalyst 46 and downstream of particulate filter 44. After-treatment control module 40 controls $NO_X$ reductant doser 58 to selectively inject reductant directly into the exhaust gas stream prior to entering SCR catalyst 46. The reductant may include various formulations, such as, for example, an aqueous urea that evaporates in the exhaust stream to produce ammonia ($NH_3$). The ammonia reacts with $NO_X$ in the presence of SCR catalyst 46 to reduce the $NO_X$ to less harmful emissions, such as $N_2$ and $H_2O$. SCR catalyst 46 may include any of variety of catalyst, such as, for example, a vanadium-based catalyst, and a zeolite-based catalyst, such as a Cu-Zeolite or a Fe-Zeolite catalyst.

AMOX catalyst 48 may be any of various flow-through catalysts configured to react with ammonia to produce mainly nitrogen. Generally, AMOX catalyst 48 operates to remove ammonia that has slipped through or exited SCR catalyst 46 without reacting with $NO_X$ in the exhaust. AMOX catalyst 48 is also capable of oxidizing hydrocarbons (HC) present in the exhaust gas stream. AMOX catalyst 48 and SCR catalyst 46 may be integrated in a common housing 62, as shown schematically in FIG. 1, or may be configured as separate units.

Exhaust gas after-treatment system 14 may includes various sensors, including but not limited to a $NO_X$ sensor 64, a temperature sensor 66, and a combined ammonia/$NO_X$ sensor 68, that are disposed throughout exhaust gas after-treatment system 14. The various sensors may be operably connected to after-treatment control module 40 to monitor operating conditions and provide input for controlling exhaust gas after-treatment system 14. $NO_X$ sensor 64 may be positioned downstream of diesel oxidation catalyst 42 and upstream of $NO_X$ reductant doser 58 for detecting the concentration of $NO_X$ in the exhaust gas stream exiting diesel oxidation catalyst 42. Temperature sensor 66 may be positioned upstream of SCR catalyst 46 for measuring a temperature of the exhaust gas stream entering SCR catalyst 46. Combined ammonia/$NO_X$ sensor 68 may be positioned downstream of AMOX catalyst 48 for detecting the combined concentration of ammonia ($NH_3$) and $NO_X$ exiting AMOX catalyst 48.

Although exemplary exhaust gas after-treatment system 14 is shown to include one of a diesel oxidation catalyst 42, catalyzed diesel particulate filter 44, SCR catalyst 46, and AMOX catalyst 48 positioned in particular locations relative to each other along the exhaust gas flow path, other configurations may include more than one of any of the various catalysts positioned in any of various positions relative to each other along the exhaust flow path to accommodate a particular application. Further, although diesel oxidation catalyst 42 and AMOX catalyst 48 are generally non-selective catalysts, in some embodiments, the oxidation and AMOX catalysts can be selective catalysts.

Over time, AMOX catalyst 48 may become less efficient at converting $NH_3$ and hydrocarbons to less harmful compounds. This could result in increasing quantities of $NH_3$ and hydrocarbons discharging into the atmosphere. The $NH_3$ conversion efficiency of AMOX catalyst 48 may be periodically checked to determine if the efficiency has fallen below a selected minimum threshold that may indicate AMOX catalyst 48 requires refurbishing or replacement. The $NH_3$ conversion efficiency may be monitored and a notification or warning may issue indicating that AMOX catalyst 48 needs servicing when the efficiency falls below the selected efficiency level.

Figure 2:
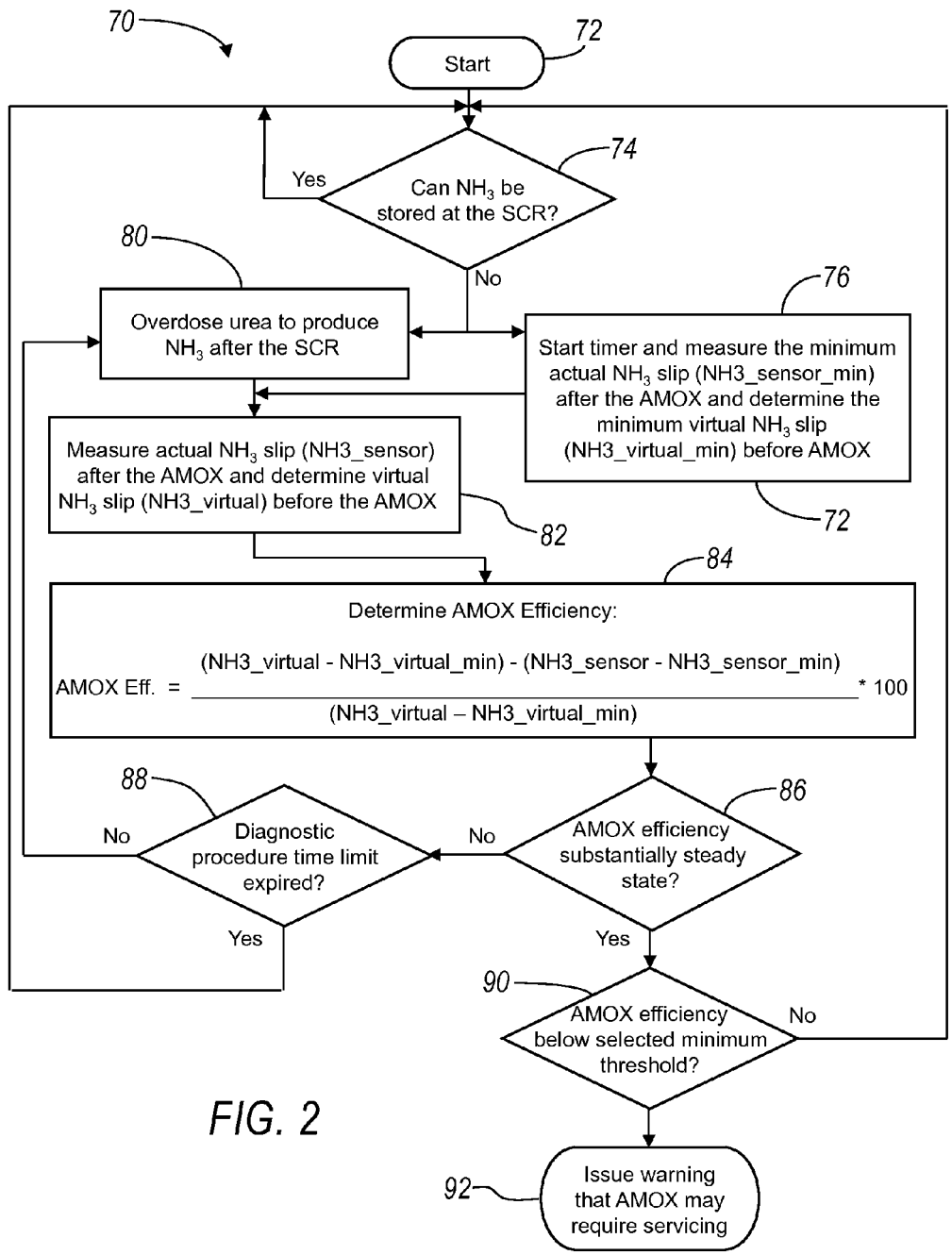
FIG. 2 is a block diagram of an exemplary AMOX diagnostic procedure for evaluating an $NH_3$ conversion efficiency of the AMOX.

FIG. 2 illustrates an exemplary AMOX diagnostic procedure 70 for determining the $NH_3$ conversion efficiency of AMOX catalyst 48. The procedure generally involves injecting urea into the exhaust gas stream upstream of SCR 46 in a quantity sufficient to cause $NH_3$ to slip past SCR 46. The excess $NH_3$ passing through AMOX 48 may be converted to less harmful compounds, such as $H_2O$ and $N_2$. If AMOX 48 is operating at 100% efficiency, the entire quantity of $NH_3$ passing through AMOX 48 will be converted to other compounds and no $NH_3$ will be detected by ammonia/$NO_X$ sensor 68. If AMOX 48 is operating at something less than 100% efficiency, ammonia/$NO_X$ sensor 68 will generally detect $NH_3$ in the exhaust gas stream exiting AMOX 48. The amount of $NH_3$ exiting AMOX 48 relative to the amount of $NH_3$ entering AMOX 48 may be used to evaluate the $NH_3$ conversion efficiency of AMOX 48, which in turn may provide an indication of whether AMOX 48 is operating as desired or requires servicing.

Continuing to refer to FIG. 2, ACM 40 and/or ECM 26 may include one or more memories for storing, and one or more processors for executing, instructions that embody in whole or part AMOX diagnostic procedure 70. AMOX diagnostic procedure 70 is initiated at block 72. The procedure proceeds to block 74, where it is determined if SCR 46 is capable of storing $NH_3$. The $NH_3$ storage capacity of SCR 46 is generally temperature dependent, and may fluctuate with changes in the operating temperature of SCR 46. Increasing the operating temperature of SCR 46 may cause stored $NH_3$ to release into the exhaust gas stream, whereas decreasing the operating temperature may cause excess $NH_3$ in the exhaust gas stream to be stored in SCR 46. The occurrence of either one of these events may cause inaccuracies in determining the $NH_3$ conversion efficiency of AMOX 48. For example, if the temperature of SCR 46 is such that a portion of $NH_3$ present in the exhaust gas stream is stored in the SCR rather than passing through, less $NH_3$ will enter AMOX 48, potentially resulting in a lower concentration level of $NH_3$ being detected at ammonia/$NO_X$ sensor 68 than if no $NH_3$ were stored in SCR 46. The lower $NH_3$ concentration rate may cause a higher efficiency to be determined for AMOX 48 than would predicted if a portion of the $NH_3$ was not stored in SCR 46. Similarly, increasing the operating temperature of SCR 46 may cause a portion of the $NH_3$ stored in the SCR to be released into the exhaust gas stream. This could result in an inaccurately low AMOX conversion efficiency.

To help minimize the detrimental effect $NH_3$ storage may have on accurately predicting AMOX efficiency, AMOX diagnostic procedure 70 can be run at an SCR operating temperature high enough to substantially prevent $NH_3$ storage. The temperature at which $NH_3$ may no longer be stored in SCR 46 is dependent, at least in part, on the catalyst material employed. Generally, however, $NH_3$ storage does not occur at temperatures above 450 degrees Celsius. The temperature of SCR 46 generally corresponds to the temperature of the exhaust gas stream entering the SCR, which may be monitored using temperature sensor 66. If SCR 46 is operating at a temperature in which substantially no $NH_3$ storage will occur, AMOX diagnostic procedure 70 proceeds to block 76 and block 80, where baseline $NH_3$ readings are acquired. If SCR 46 is operating at a temperature at which $NH_3$ storage can occur, AMOX diagnostic procedure 70 does not advance to block 76 and block 80, but instead continues to loop through block 74 and monitor the operating temperature of SCR 46 until such time the SCR operating temperature exceeds the maximum temperature at which $NH_3$ storage may occur.

If it is determined at block 74 of AMOX diagnostic procedure 70 that SCR 46 is operating at a temperature that substantially prevents $NH_3$ storage from occurring, the diagnostic procedure proceeds to block 76 and block 80, where the initial $NH_3$ slip rate entering AMOX 48 (NH3_virtual_min) and the $NH_3$ slip rate exiting AMOX 48 (NH3_sensor_min) are determined. The exemplary configuration of exhaust gas after-treatment system 14, as shown in FIG. 1, may not employ an actual sensor for measuring the concentration rate of $NH_3$ present in the exhaust gas stream passing between SCR 46 and AMOX 48. The $NH_3$ concentration rate entering AMOX 48 may be analytically determined. A virtual $NH_3$ sensor 78, as shown in FIG. 1, generally indicates the location at which the concentration rate of $NH_3$ present in the exhaust gas stream entering AMOX 48 is analytically determined. An actual $NH_3$ sensor for measuring the concentration rate of $NH_3$ in the exhaust gas stream may be used in place of virtual $NH_3$ sensor 78.

The concentration rate of $NH_3$ entering AMOX 48 may be analytically determined from the known chemical reaction occurring between the $NH_3$ and $NO_X$ in the exhaust gas stream in the presence of SCR 46. Generally, $NO_X$ is reduced by $NH_3$ in the following three stoichiometric chemical reactions:

$$4NH_3+4NO+O_2 \rightarrow 4N_2+6H_2O \quad (1)$$

$$4NH_3+2NO+2NO_2 \rightarrow 4N_2+6H_2O \quad (2)$$

$$4NH_3+3NO_2 \rightarrow 7/2N_2+6H_2O \quad (3)$$

The predicted $NO_X$ reaction rate is also at least partially dependent on the $NH_3$ concentration rate and the temperature of SCR 46. Degradation of the catalyst in SCR 46 may also affect the reaction rate. The concentration of $NO_X$ in the exhaust gas stream (i.e., NO and $NO_2$), may be measured using $NO_X$ sensor 64. ACM 40 may determine a desired $NH_3$ concentration rate based on the measured $NO_X$ concentration rate. The above three known chemical reactions and the known concentration rates of $NO_X$ and $NH_3$ in the exhaust gas stream entering SCR 46 can be used to arrive at a predicted initial $NH_3$ concentration rate (i.e., $NH_3$ slip rate) exiting SCR 46 and entering AMOX 48, as represented by virtual $NH_3$ sensor 78 in FIG. 1.

The initial $NH_3$ slip rate exiting AMOX 48 may be measured using ammonia/$NO_X$ sensor 68. The configuration of ammonia/$NO_X$ sensor 68 may depend, at least in part, on the type of emission being measured. For example, one configuration of sensor 68 may only measure $NH_3$. Other configurations are capable of measuring both $NO_X$ and $NH_3$ present in the exhaust gas stream. To obtain the $NH_3$ slip rate from AMOX 48 when using a sensor that detects both $NO_X$ and $NH_3$, the concentration rate of $NO_X$ exiting AMOX 48 will need to be deducted from the $NO_X$/$NH_3$ concentration rate detected by sensor 68 to arrive at the $NH_3$ slip rate from AMOX 48. An estimate of the $NO_X$ concentration rate exiting AMOX 48 may be analytically determined using one or more of the above identified chemical reactions (1), (2) and (3), and the known concentration rates of $NO_X$ and $NH_3$ in the exhaust gas stream entering SCR 46.

A timer may be initialized in block 76 of AMOX diagnostic procedure 70. The timer tracks the elapsed time of AMOX diagnostic procedure 70. A time limit may be set for AMOX diagnostic procedure 70. The diagnostic procedure may exit if a substantially steady AMOX efficiency is not reached within the allotted time limit (see block 88 of AMOX diagnostic procedure 70). This could occur based on a variety of reasons, such as, for example, changes in engine operating conditions causing fluctuations in exhaust gas temperature that may produce inconsistent AMOX efficiency predictions. Other potential causes may include a malfunctioning emission system that may require servicing.

Upon obtaining initial $NH_3$ slip rates before and after AMOX 48 in block 76, AMOX diagnostic procedure 70 proceeds to block 82. ACM 40 may determine the urea dosing rate using one or more of the above identified chemical reactions (1), (2) and (3), and the $NO_X$ concentration rate detected by $NO_X$ sensor 64. The predicted urea dosing rate required to reduce the $NO_X$ present in the exhaust gas stream may be temporarily increased to a diagnostic dosing rate sufficient to cause $NH_3$ to slip past SCR 46. $NO_X$ reductant doser 58 may inject urea at the desired diagnostic dosing rate in response to a signal received from ACM 40. $NO_X$ reductant doser 58 continues to inject urea at the desired dosing rate until either a substantially steady state AMOX efficiency is achieved, or the time allotted to perform the AMOX diagnostic procedure expires. The diagnostic dosing rate remains substantially constant throughout AMOX diagnostic procedure 70.

AMOX diagnostic procedure 70 proceeds from block 80 to block 82, where the NH₃ slip rate entering AMOX 48 (NH3_virtual) and the NH₃ slip rate exiting AMOX 48 (NH3_sensor min) are determined at various intervals throughout the diagnostic procedure. The NH₃ concentration rate at virtual sensor 78 may be analytically determined in the manner described above for determining the initial NH₃ slip rates. The NH₃ slip rate exiting AMOX 48 may be measured using ammonia/NO$_X$ sensor 68. Upon determining the NH₃ slip rates entering and exiting AMOX 48, the diagnostic procedure proceeds to block 84, where the NH₃ conversion efficiency of AMOX 48 is determined.

The conversion efficiency of AMOX 48 may be determined using equation (4) below.

$$AMOX\ \text{Efficiency} = \frac{(NH3\_virtual - NH3\_virtual\_min) - (NH3\_sensor - NH3\_sensor\_min)}{(NH3\_virtual - NH3\_virtual\_min)} * 100 \quad (4)$$

Where:
 NH3_virtual_min is the initial NH₃ slip rate at virtual sensor 78 as determine in block 76 of AMOX diagnostic procedure 70;
 NH3_sensor_min is the initial NH₃ slip rate measured by ammonia/NO$_X$ sensor 68 at block 76 of AMOX diagnostic procedure 70;
 NH3_virtual is the NH₃ slip rate at virtual sensor 78 as determine at block 82 of AMOX diagnostic procedure 70; and
 NH3_sensor is the NH₃ slip rate measured by ammonia/NO$_X$ sensor 68 at block 82 of AMOX diagnostic procedure 70.

At block 86 of AMOX diagnostic procedure 70, the AMOX conversion efficiency computed at block 84 is monitored at each interval of the diagnostic procedure to determine if the efficiency has reached a substantially steady state condition. If it has not, AMOX diagnostic procedure 70 proceeds to block 88 to determine of the time limit for performing the diagnostic procedure has expired. If the time limit has expired, AMOX diagnostic procedure 70 returns to the block 74, at which point the diagnostic procedure starts again anew. If the time limit has not expired, AMOX diagnostic procedure 70 loops back to block 80 to repeat the process of overdosing urea to generate NH₃ slip at virtual sensor 78 and determining the corresponding AMOX conversion efficiency at block 84 based on the NH₃ slip rates determined at block 82.

If it is determined at block 86 of AMOX diagnostic procedure 70 that the AMOX conversion efficiency has reached a substantially steady state condition, the diagnostic procedure proceeds to block 90 where the AMOX conversion efficiency determined at block 84 is evaluated against a selected minimum AMOX conversion efficiency threshold. If the AMOX efficiency is below the minimum threshold, a warning is issued at block 92 notifying a vehicle operator or service personnel that the AMOX conversion efficiency has dropped below the desired minimum threshold and that AMOX 48 may require servicing. If it is determined the AMOX conversion efficiency is above the minimum threshold, AMOX diagnostic procedure 70 returns to block 74 to restart the diagnostic procedure anew.

Figure 3:
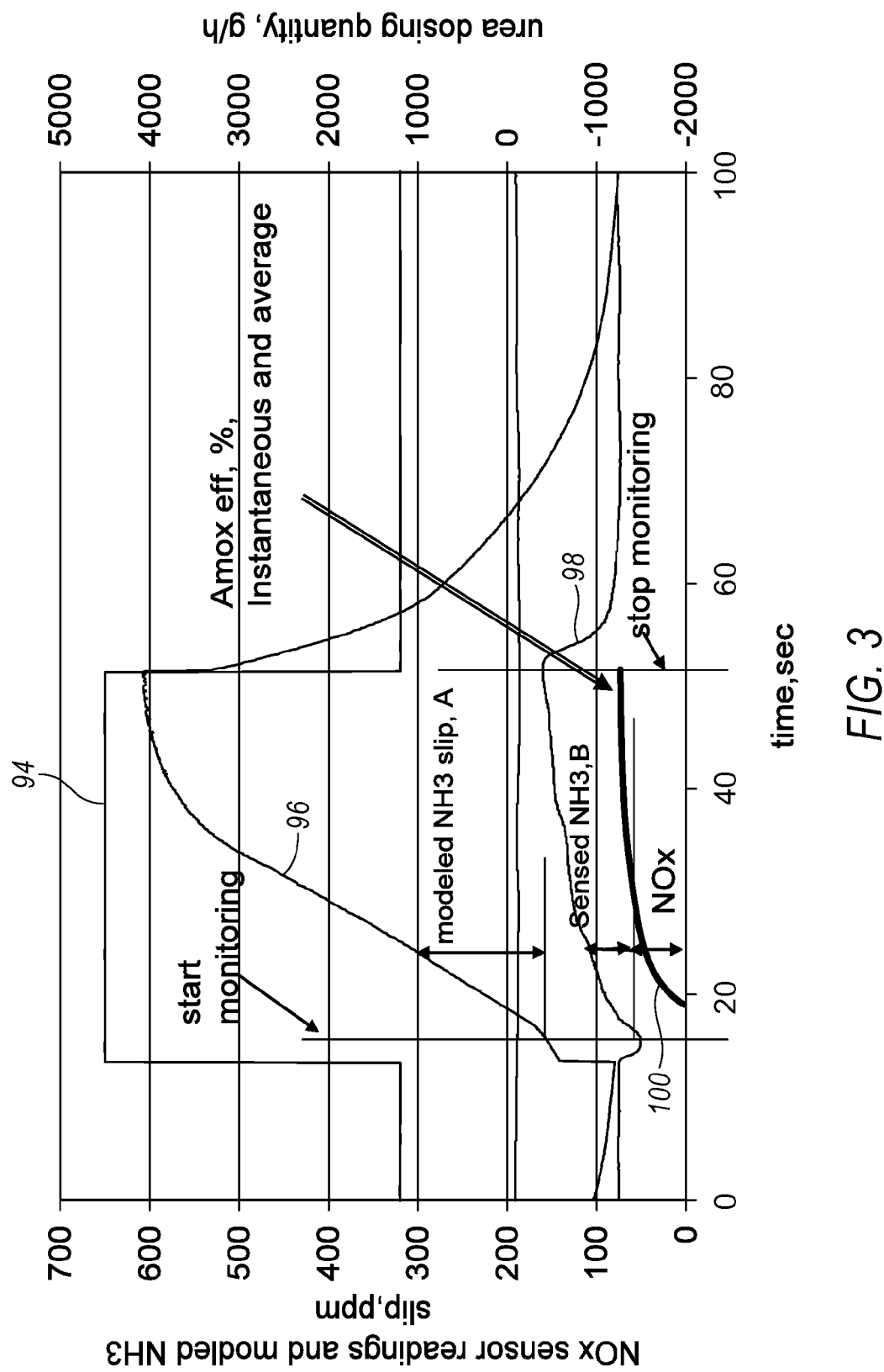
FIG. 3 graphically depicts representative changes in a $NO_X$ dosing rate and $NH_3$ and $NO_X$ concentration rates as a function of time that may occur when implementing the exemplary AMOX diagnostic procedure.

FIG. 3 graphically depicts representative changes in the NO$_X$ dosing rate and NH₃ and NO$_X$ concentration rates as a function of time that may occur when implementing exemplary AMOX diagnostic procedure 70. At a time of approximately 15 seconds, ACM 40 issues a command instructing NO$_X$ reductant doser 58 to inject urea into the exhaust stream at the diagnostic dosing rate determined at block 80 of AMOX diagnostic procedure 70 (see FIG. 2). In the illustrated example, the diagnostic dosing rate, represented by curve 94 in FIG. 3, is set at approximately 650 gallons/hour, and is held generally constant for the duration of the diagnostic procedure. Initiation of the diagnostic dosing rate causes a corresponding increase in the NH₃ slip rate from SCR 46, which is represented by curve 96 in FIG. 3. The increased dosing rate also causes a corresponding increase in the NH₃ slip rate from AMOX 48, which is represented by curve 98 in FIG. 3. The conversion efficiency of AMOX 48 is represented by curve 100 in FIG. 3. The AMOX conversion efficiency begins approaching steady state at a time of approximately 40 seconds. Steady state is achieved at approximately 52 seconds, at which point AMOX diagnostic procedure 70 is terminated.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of evaluating an ammonia conversion efficiency of an ammonia oxidation (AMOX) catalyst for reducing ammonia and hydrocarbons present in an exhaust gas stream, the AMOX associated with an exhaust gas aftertreatment system having a selective catalytic reduction (SCR) catalyst for reducing oxides of nitrogen (NO$_X$) present in the exhaust gas stream and a dosing system for introducing a reductant into the exhaust gas stream for reacting with the NO$_X$ in the presence of the SCR catalyst, the AMOX catalyst arranged downstream of the SCR catalyst, the method comprising the steps of:
 a) introducing the reductant into the exhaust gas stream at a first dosing rate per original NO$_X$ reduction requirement;
 b) introducing the reductant into the exhaust gas stream at a second dosing rate sufficient to cause ammonia in the exhaust gas stream to slip the SCR catalyst;

c) determining a first ammonia concentration rate of the exhaust gas stream at a location downstream of the SCR catalyst and upstream of the AMOX catalyst while introducing the reductant at the first dosing rate;

d) determining a second ammonia concentration rate of the exhaust gas stream at a location downstream of the AMOX catalyst while introducing the reductant at the first dosing rate;

e) determining a third ammonia concentration rate of the exhaust gas stream at a location downstream of the SCR catalyst and upstream of the AMOX catalyst while introducing the reductant at the second dosing rate;

f) determining a fourth ammonia concentration rate of the exhaust gas stream at a location downstream of the AMOX catalyst while introducing the reductant at the second dosing rate; and g) determining an ammonia conversion efficiency of the AMOX catalyst based on the determined first, second, third and fourth ammonia concentration rates.

2. A method as recited in claim 1, wherein the second dosing rate is higher than the first dosing rate.

3. A method as recited in claim 1, wherein the first and third ammonia concentration rates are determined analytically, and the second and fourth ammonia concentration rates are measured values.

4. A method as recited in claim 3, wherein the first and third ammonia concentration rates are determined based on at least one of a measured concentration rate of $NO_X$ in the exhaust gas stream at a location upstream of the SCR, the first dosing rate and the second dosing rate.

5. A method as recited in claim 1, further comprising operating the SCR catalyst at a catalyst temperature that substantially prevents ammonia storage at the SCR catalyst.

6. A method as recited in claim 5, further comprising operating the SCR at a catalyst temperature above 450 degrees Celsius.

7. A method as recited in claim 1, further comprising:
repeating steps (b) through (g) at a plurality of time intervals; and
determining if the ammonia conversion efficiency is substantially steady state by comparing each determined ammonia conversion efficiency with at least one of the previously determined ammonia efficiencies.

8. A method as recited in claim 7, wherein the step of repeating steps (b) through (g) occurs over a selected time period.

9. A method as recited in claim 8, wherein steps (b) through (g) are repeated until the selected time period expires or the ammonia conversion efficiency is substantially steady state.

10. A method as recited in claim 1, further comprising:
comparing the determined AMOX ammonia conversion efficiency against a selected minimum conversion efficiency threshold; and
issuing a notification if the determined AMOX conversion efficiency is below the selected minimum conversion efficiency threshold.

11. An emission control system comprising:
a selective catalytic reduction (SCR) catalyst for reducing oxides of nitrogen ($NO_X$) present in an exhaust gas stream;
an ammonia oxidation (AMOX) catalyst for reducing ammonia and hydrocarbons present in the exhaust gas stream, the AMOX catalyst arranged downstream of the SCR catalyst;
a dosing system for introducing a reductant at a selected dosing rate into the exhaust gas stream for reacting with the $NO_X$ in the presence of the SCR catalyst;
a first sensor for determining a first ammonia slip rate from the AMOX catalyst;
an exhaust gas after-treatment control module (ACM) including a virtual sensor for determining a second ammonia slip rate from the SCR catalyst, the ACM operably connected to the first sensor and the dosing system;
a second sensor for detecting a $NO_X$ concentration rate in the exhaust gas stream at a location upstream of the SCR catalyst, the second sensor operably connected to the ACM; and
a third sensor for detecting a temperature of the exhaust gas stream at a location upstream of the SCR catalyst, the third sensor operably connected to the ACM, wherein the ACM determines a first dosing rate based on the $NO_X$ concentration rate detected by the second sensor, and a second dosing rate in response to an exhaust gas temperature detected by the third sensor.

12. An emission control system as recited in claim 11, wherein the ACM determines an ammonia slip rate at the virtual sensor based on the $NO_X$ concentration detected by the second sensor and a dosing rate at which the reactant is introduced into the exhaust gas stream.

13. An emission control system as recited in claim 12, wherein the first and second ammonia slip rates are determined while introducing the reactant at the second dosing rate.

14. An emission control system as recited in claim 11, wherein the ACM determines an ammonia conversion efficiency based on the first ammonia slip rate detected by the first sensor and the second ammonia slip rate determined at the virtual sensor.

15. An emission control system as recited in claim 11, wherein the ammonia slip rate determined at the virtual sensor corresponds to the ammonia concentration rate of the exhaust gas stream at a location between the SCR catalyst and the AMOX catalyst.

16. An emission control system as recited in claim 11, wherein the reactant is ammonia.

17. An emission control system as recited in claim 11, wherein the reactant is an urea.

* * * * *